US012739074B2

(12) United States Patent
Yang et al.

(10) Patent No.: US 12,739,074 B2
(45) Date of Patent: Sep. 15, 2026

(54) METHOD, USER EQUIPMENT, AND BASE STATION USED FOR WIRELESS COMMUNICATION UTILIZING COMBINATION LISTS FOR DCI ASSOCIATED WITH MULTIPLE CELLS

(71) Applicant: Apogee 5G Global, LLC, Plano, TX (US)

(72) Inventors: Lin Yang, Shanghai (CN); Shulin Song, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 125 days.

(21) Appl. No.: 18/508,267

(22) Filed: Nov. 14, 2023

(65) Prior Publication Data

US 2024/0163046 A1 May 16, 2024

(30) Foreign Application Priority Data

Nov. 15, 2022 (CN) ......................... 202211427001.5

(51) Int. Cl.
*H04L 5/00* (2006.01)
*H04W 72/1273* (2023.01)

(52) U.S. Cl.
CPC .......... *H04L 5/0048* (2013.01); *H04L 5/0092* (2013.01); *H04W 72/1273* (2013.01)

(58) Field of Classification Search
CPC ....... H04L 5/0048; H04L 5/0092; H04L 5/00; H04L 5/001; H04L 5/0035; H04L 5/0053; H04W 72/1273; H04W 72/04; H04W 72/12
See application file for complete search history.

(56) References Cited

U.S. PATENT DOCUMENTS 11,070,344 B2 * 7/2021 You ........................ H04L 1/1812
11,792,787 B2 * 10/2023 Wu ...................... H04B 7/0617 370/330
11,800,524 B2 * 10/2023 Marinier ............... H04L 1/1854
11,985,643 B2 * 5/2024 Takeda .................. H04W 72/23
12,041,648 B2 * 7/2024 Lee ....................... H04L 5/1469
(Continued)

OTHER PUBLICATIONS

Third Generation Partnership Project, "Technical Specification Group Radio Access Network; NR; Multiplexing and channel coding (Release 17)," 3GPP TS 38.212 V17.3.0 (Sep. 2022).
(Continued)

*Primary Examiner* — Pakee Fang
(74) *Attorney, Agent, or Firm* — Volpe Koenig

(57) ABSTRACT

A first node receives a first signaling and a first DCI; where the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), and a name of each of the M field(s) is the first name. Application is applicable to different kinds of scenarios by configuring types of multiple DCI fields via RRC signaling, which reduces the DCI overhead.

20 Claims, 5 Drawing Sheets

(56) References Cited

U.S. PATENT DOCUMENTS

| | | | | |
|---|---|---|---|---|
| 12,452,000 | B2 * | 10/2025 | Shen | H04L 1/1854 |
| 2017/0367046 | A1 * | 12/2017 | Papasakellariou | H04W 72/23 |
| 2018/0338301 | A1 * | 11/2018 | Gao | H04L 5/0048 |
| 2023/0085896 | A1 * | 3/2023 | Takeda | H04L 5/0044 |

OTHER PUBLICATIONS

Third Generation Partnership Project, "Technical Specification Group Radio Access Network; NR; Physical layer procedures for data (Release 17)," 3GPP TS 38.214 V17.3.0 (Sep. 2022).

Third Generation Partnership Project, "Technical Specification Group Radio Access Network; NR; Radio Resource Control (RRC) protocol specification (Release 17)," 3GPP TS 38.331 V17.2.0 (Sep. 2022).

* cited by examiner

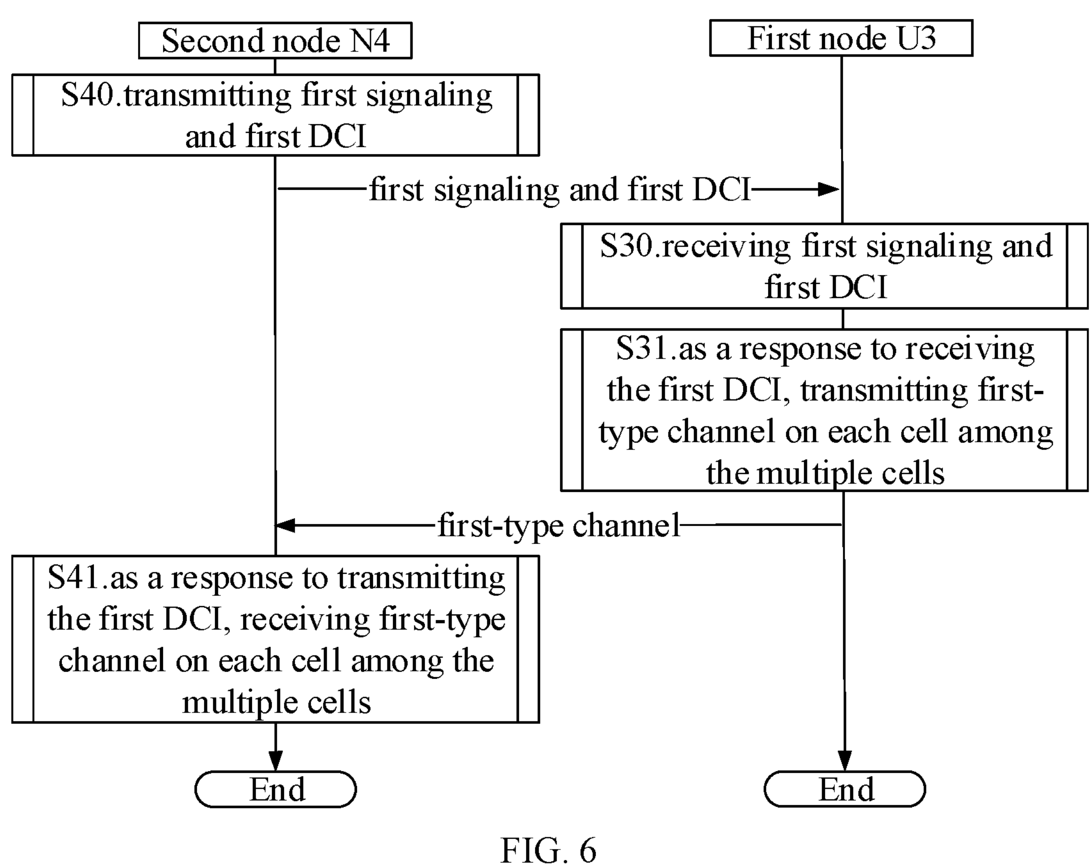
FIG. 6
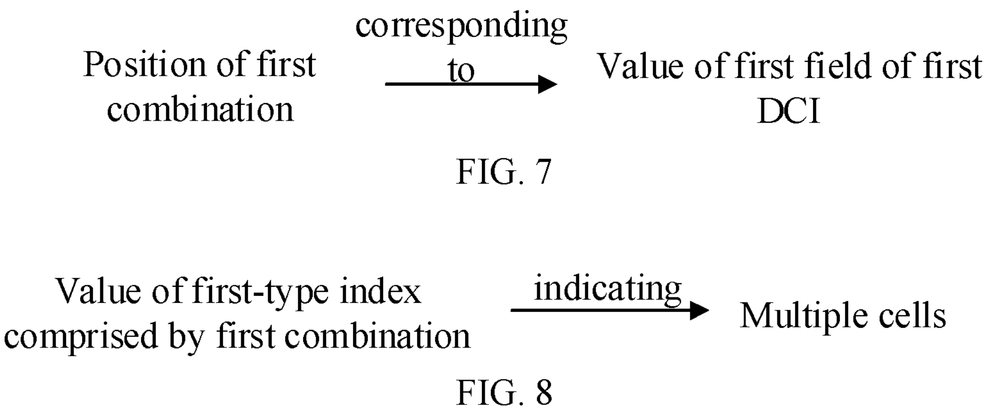
FIG. 7
FIG. 8
FIG. 9

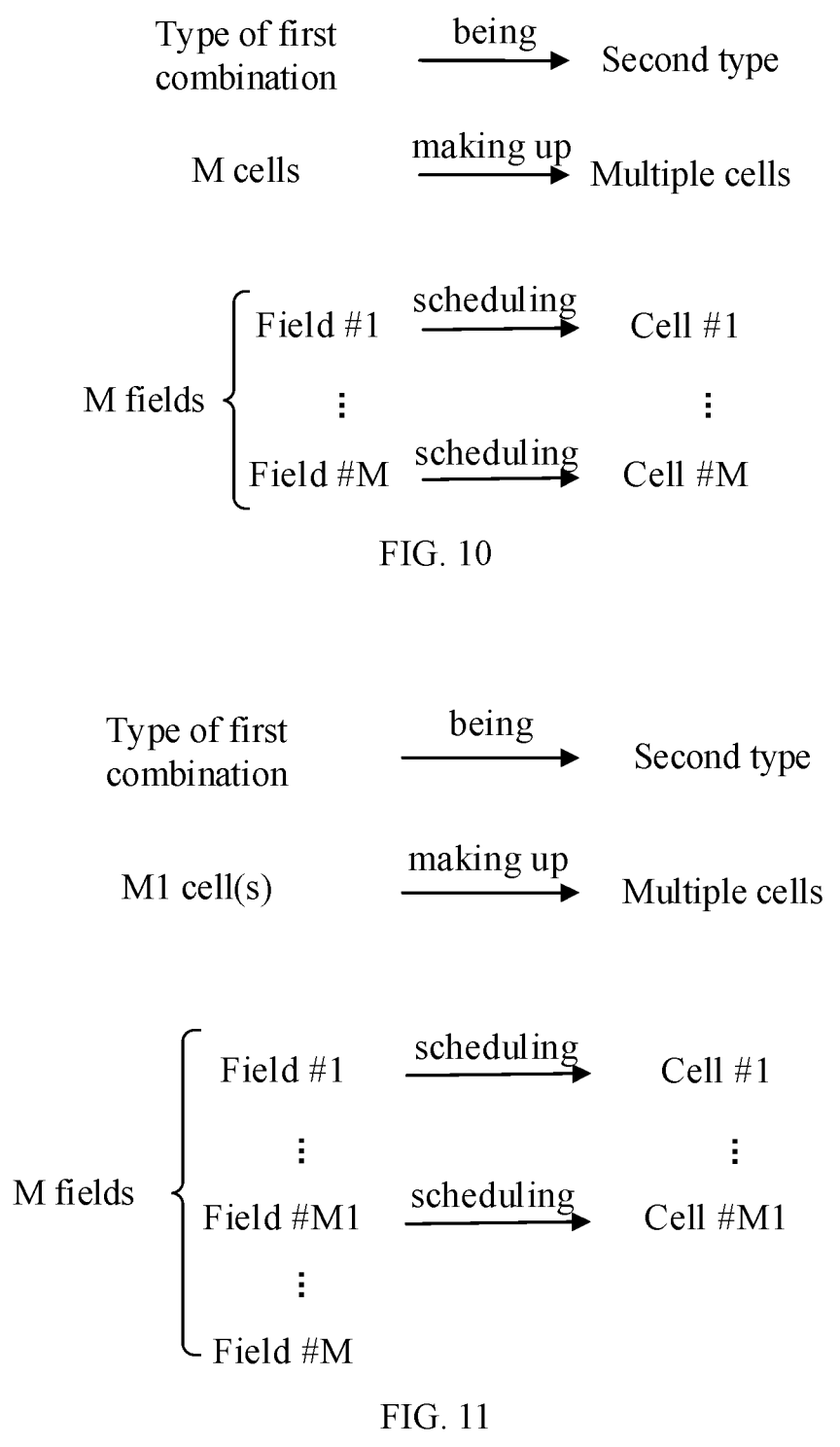

Type of first combination —being→ Second type

M cells —making up→ Multiple cells

M fields {
Field #1 —scheduling→ Cell #1
⋮ ⋮
Field #M —scheduling→ Cell #M
}

FIG. 10

Type of first combination —being→ Second type

M1 cell(s) —making up→ Multiple cells

M fields {
Field #1 —scheduling→ Cell #1
⋮ ⋮
Field #M1 —scheduling→ Cell #M1
⋮
Field #M
}

FIG. 11

METHOD, USER EQUIPMENT, AND BASE STATION USED FOR WIRELESS COMMUNICATION UTILIZING COMBINATION LISTS FOR DCI ASSOCIATED WITH MULTIPLE CELLS

CROSS REFERENCE TO RELATED APPLICATIONS

This application claims the priority benefit of Chinese Patent Application No. 202211427001.5, filed on Nov. 15, 2022, the full disclosure of which is incorporated herein by reference.

BACKGROUND

Technical Field

The present application relates to transmission methods and devices in wireless communication systems, and in particular to a scheme and device for Downlink Control Information (DCI) in a wireless communication system.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

Currently studies have already kicked off on 5G NR in R18, with Multi-cell PUSCH/PDSCH scheduling with a single DCI being one of its Study Items (SI). The study of multi-cell scheduling includes DCI format design, DCI size and BD/CCE budget (where BD referring to Blind Decoding, and CCE referring to Control Channel Element), a maximum cell number scheduled with a single DCI, Search Space (SS) configurations, HARQ enhancements, and DCI field design, such as for a Bandwidth Part (BWP) Indicator, a Frequency Domain Resource Assignment (FDRA), a Time Domain Resource Assignment (TDRA), and a Downlink Assignment Index (DAT).

SUMMARY

Inventors find through researches that in a wireless communication system, when a single DCI schedules multiple cells, the determination of whether a field of the DCI indicates the same information for the multiple cells or multiple fields of the DCI sharing an identical name indicate different information for each of the multiple cells respectively is a key issue unaddressed.

To address the above problem, the present application provides a solution. It should be noted that though the present application is originally targeted at illustrating a transmission scenario with Multi-cell PUSCH/PDSCH scheduling with a single DCI, it is also applicable to transmission scenarios with single-cell PUSCH/PDSCH scheduling with a single DCI. Furthermore, the adoption of a unified design scheme for various scenarios, including but not limited to Multi-cell PUSCH/PDSCH scheduling with a single DCI and single-cell PUSCH/PDSCH scheduling with a single DCI, contributes to the reduction of hardcore complexity and costs. It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first signaling and a first DCI; where the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and as a response to receiving the first DCI, operating a first-type channel on each cell among the multiple cells;

herein, the operating is receiving and the first-type channel is a PDSCH, or, the operating is transmitting and the first-type channel is a PUSCH; M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

In one embodiment, the first signaling configures the type of field of the first DCI, thus reducing the signaling overhead.

In one embodiment, by configuring the type of field of the first DCI, the flexibility of scheduling can be enhanced.

According to one aspect of the present application, characterized in that the first combination is a combination of which a position in the first combination list corresponds to a value of the first field of the first DCI.

In one embodiment, the above method determines the type of a DCI field configured for the multiple cells being scheduled according to a value of the first field of the first DCI, thus reducing the signaling overhead.

According to one aspect of the present application, characterized in that each combination in the first combination list comprises at least one first-type index, and there exists no first-type index that belongs to both two combinations in the first combination list, the first combination is a combination that meets a first condition in the first combination list, the first condition being that the value/values of the first-type index/indexes being comprised indicates/indicate the multiple cells.

In one embodiment, the above method associates the first-type index(es) with a combination corresponding to the multiple cells being scheduled, thus enhancing the flexibility of scheduling.

According to one aspect of the present application, characterized in that each combination in the first combination list comprises multiple names, and each of the multiple names is a name of a DCI field, where any two names among the multiple names are different.

In one embodiment, the above method can configure types of multiple DCI fields via the first signaling, which can reduce the redundancy overhead of the first DCI.

According to one aspect of the present application, characterized in that when the type of the first combination is the second type, the multiple cells consist of M cells, and the M fields are respectively used for schedulings of the M cells.

In one embodiment, the above method indicates M cell(s) (respectively) by M field(s), thus enhancing the flexibility of scheduling.

According to one aspect of the present application, characterized in that when the type of the first combination is the second type, the multiple cells consist of M1 cells, where the first M1 fields of the M fields are respectively used for schedulings of the M1 cells, M being a positive integer no less than M1.

In one embodiment, the above method provides a fixed Payload Size of DCI, which reduces the complexity of Blind Detection.

The present application provides a method in a second node for wireless communications, comprising:

- transmitting a first signaling and a first DCI; where the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and
- as a response to transmitting the first DCI, executing a first-type channel on each cell among the multiple cells;
- herein, the executing is transmitting and the first-type channel is a PDSCH, or, the executing is receiving and the first-type channel is a PUSCH; M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

According to one aspect of the present application, characterized in that the first combination is a combination of which a position in the first combination list corresponds to a value of the first field of the first DCI.

According to one aspect of the present application, characterized in that each combination in the first combination list comprises at least one first-type index, and there exists no first-type index that belongs to both two combinations in the first combination list, the first combination is a combination that meets a first condition in the first combination list, the first condition being that the value/values of the first-type index/indexes being comprised indicates/indicate the multiple cells.

According to one aspect of the present application, characterized in that each combination in the first combination list comprises multiple names, and each of the multiple names is a name of a DCI field, where any two names among the multiple names are different.

According to one aspect of the present application, characterized in that when the type of the first combination is the second type, the multiple cells consist of M cells, and the M fields are respectively used for schedulings of the M cells.

According to one aspect of the present application, characterized in that when the type of the first combination is the second type, the multiple cells consist of M1 cells, where the first M1 fields of the M fields are respectively used for schedulings of the M1 cells, M being a positive integer no less than M1.

The present application provides a first node for wireless communications, comprising:

- a first receiver, receiving a first signaling and a first DCI; where the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and
- a first transceiver, as a response to receiving the first DCI, operating a first-type channel on each cell among the multiple cells;
- herein, the operating is receiving and the first-type channel is a PDSCH, or, the operating is transmitting and the first-type channel is a PUSCH; M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

The present application provides a second node for wireless communications, comprising:

- a second transmitter, transmitting a first signaling and a first DCI; where the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and
- a second transceiver, as a response to transmitting the first DCI, executing a first-type channel on each cell among the multiple cells;
- herein, the executing is transmitting and the first-type channel is a PDSCH, or, the executing is receiving and the first-type channel is a PUSCH; M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a flowchart of transmission according to another embodiment of the present application.

FIG. 7 illustrates a schematic diagram of a first combination's position corresponding to the value of a first field of a first DCI according to one embodiment of the present application.

FIG. 8 illustrates a schematic diagram of value(s) of first-type index(es) comprised by a first combination indicating multiple cells according to one embodiment of the present application.

FIG. 9 illustrates a schematic diagram of each combination in a first combination list comprising multiple names according to one embodiment of the present application.

FIG. 10 illustrates a schematic diagram of M fields being respectively used for scheduling of M cells according to one embodiment of the present application.

FIG. 11 illustrates a schematic diagram of the first M1 field(s) among M fields being (respectively) used for scheduling of M1 cell(s) according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
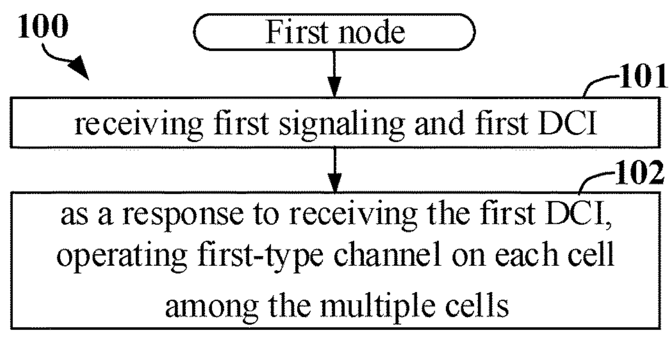
FIG. 1 illustrates a flowchart of a first DCI scheduling a first-type channel according to one embodiment of the present application.

Embodiment illustrates a flowchart of a first DCI scheduling a first-type channel according to one embodiment of the present application, as shown in FIG. 1. In 100 illustrated by FIG. 1, each box represents a step.

In Embodiment 1, the first node in the present application receives a first signaling and a first DCI in step 101; and in step 102, as a response to receiving the first DCI, operates a first-type channel on each cell among the multiple cells; where the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; the operating is receiving and the first-type channel is a PDSCH, or, the operating is transmitting and the first-type channel is a PUSCH; M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

In one embodiment, a physical layer channel occupied by the first signaling includes a Physical Downlink Control Channel (PDCCH).

In one embodiment, a protocol layer to which the first signaling belongs is a Radio Resource Control (RRC) layer.

In one embodiment, the first signaling is an RRC layer signaling.

In one embodiment, the first signaling is an RRC Information Element (IE).

In one embodiment, the first signaling comprises an RRC IE.

In one embodiment, the first signaling is an RRC parameter.

In one embodiment, the first signaling comprises an RRC parameter.

In one embodiment, the first signaling is a List.

In one embodiment, the first signaling comprises a List.

In one embodiment, the first signaling comprises Q sub-parameters, where Q is equal to a number of combinations comprised in the first combination list.

In one embodiment, the first combination list comprises Q combinations.

In one embodiment, the Q sub-parameters comprised by the first signaling are respectively used for indicating types of the Q combinations in the first combination list.

In one embodiment, each sub-parameter among the Q sub-parameters comprises one name, which is the name of a DCI field.

In one embodiment, each sub-parameter among the Q sub-parameters comprises multiple names, where each of the multiple names is the name of a DCI field.

In one embodiment, the Q sub-parameters respectively comprise Q indexes.

In one embodiment, the Q indexes include an index equal to a value of the first field of the first DCI.

In one embodiment, the multiple cells make up a cell set, and candidates of the multiple cells include Q cell sets.

In one embodiment, Q indexes comprised by the Q sub-parameters are respectively related to the Q cell sets.

In one embodiment, there do not exist two indexes among the Q indexes that belong to two sub-parameters simultaneously.

In one embodiment, each sub-parameter among the Q sub-parameters respectively comprises a parameter, and the parameter is used for indicating a type of a combination in a first combination list.

In one embodiment, a physical layer channel occupied by the first DCI includes a PDCCH.

In one embodiment, the operating is receiving, and the first DCI is a downlink DCI.

In one embodiment, the operating is transmitting, and the first DCI is an uplink DCI.

In one embodiment, the first DCI is a Non-fallback DCI.

In one embodiment, the first DCI is only detected in a UE-specific Search Space (USS) set.

In one embodiment, the operating is receiving and the first DCI schedules a Physical Downlink Shared Channel (PDSCH) on each cell among the multiple cells.

In one embodiment, the operating is transmitting and the first DCI schedules a Physical Uplink Shared Channel (PUSCH) on each cell among the multiple cells.

In one embodiment, the operating is receiving, and a transport channel corresponding to the first-type channel includes a Downlink Shared Channel (DL-SCH).

In one embodiment, the operating is transmitting, and a transport channel corresponding to the first-type channel includes an Uplink Shared Channel (UL-SCH).

In one embodiment, the first DCI schedules one Transport Block (TB) on each cell among the multiple cells.

In one embodiment, the first DCI schedules two TBs on each cell among the multiple cells.

In one embodiment, the first DCI comprises and only comprises M fields of which a name of each field is the first name, where the M fields are of an identical bitwidth.

In one embodiment, the first DCI comprises and only comprises M fields of which a name of each field is the first name, where among the M fields there are two fields of different bitwidths.

In one embodiment, the first DCI comprises and only comprises M fields of which a name of each field is the first name, where among the M fields there are multiple fields of different bitwidths.

In one embodiment, the first DCI schedules the multiple cells and the number of the multiple cells is 2.

In one embodiment, the first DCI schedules the multiple cells and the number of the multiple cells is 3.

In one embodiment, the first DCI schedules the multiple cells and the number of the multiple cells is 4. In one embodiment, the multiple cells include at least one serving cell.

In one embodiment, the multiple cells include at least one physical cell.

In one embodiment, the multiple cells include a Component Carrier (CC).

In one embodiment, the multiple cells include a Primary Cell (PCell).

In one embodiment, the multiple cells include a Secondary Cell (SCell).

In one embodiment, the multiple cells include a Special Cell (SpCell).

In one embodiment, the multiple cells are all serving cells of the first node.

In one embodiment, the multiple cells are respectively assigned with a SCellIndex or a ServCellIndex.

In one embodiment, the multiple cells belong to a same cell group.

In one embodiment, the multiple cells all belong to a Master Cell Group (MCG) or a Secondary Cell Group (SCG).

In one embodiment, the multiple cells have a same numerology.

In one embodiment, the multiple cells have a same Subcarrier spacing (SCS) configuration.

In one embodiment, among the multiple cells there exist two cells having different subcarrier spacing configurations.

In one embodiment, among the multiple cells there exist more than one cell having different subcarrier spacing configurations.

In one embodiment, the multiple cells belong to a same Physical Uplink Control Channel (PUCCH) group.

In one embodiment, the first combination list comprises only one combination.

In one embodiment, the first combination list comprises at least one combination.

In one embodiment, the first combination list comprises multiple combinations.

In one embodiment, the type of each combination in the first combination list only includes the first type.

In one embodiment, the type of each combination in the first combination list only includes the second type.

In one embodiment, the type of each combination in the first combination list only includes the first type and the second type.

In one embodiment, the type of each combination in the first combination list includes a type other than the first type and the second type.

In one subembodiment, the type of each combination in the first combination list includes a third type.

In one embodiment, the type of each combination in the first combination list includes multiple types other than the first type and the second type.

In one embodiment, the type of each combination in the first combination list is a first type, and each combination in the first combination list comprises a first name, where field(s) in the first DCI of which the name is the first name only includes (include) one field, M being equal to 1, and the only one field of which the name is the first name in the first DCI indicates same information for all cells among the multiple cells.

In one embodiment, the type of each combination in the first combination list is a first type, and each combination in the first combination list comprises a first name, where field(s) in the first DCI of which the name is the first name only includes (include) one field, M being equal to 1, and the only one field of which the name is the first name in the first DCI indicates different pieces of information respectively for each cell among the multiple cells.

In one subembodiment, the different pieces of information indicate the multiple cells sorted according to an ascending order of cell index respectively in sequential order.

In one subembodiment, the different pieces of information indicate the multiple cells sorted according to a descending order of cell index respectively in sequential order.

In one subembodiment, the different pieces of information indicate the multiple cells sorted according to an order from a lowest to a highest frequency of corresponding component carriers (CC) respectively in sequential order.

In one subembodiment, the different pieces of information indicate the multiple cells sorted according to an order from a highest to a lowest frequency of corresponding component carriers (CC) respectively in sequential order.

In one embodiment, the type of each combination in the first combination list is a first type, and each combination in the first combination list comprises a first name, where field(s) in the first DCI of which the name is the first name only includes (include) one field, M being equal to 1, and the only one field in the first DCI of which the name is the first name only indicates one cell among the multiple cells.

In one subembodiment, the only one field in the first DCI of which the name is the first name only indicates a cell with a smallest index among the multiple cells.

In one subembodiment, the only one field in the first DCI of which the name is the first name only indicates a cell with a second smallest index among the multiple cells.

In one subembodiment, the only one field in the first DCI of which the name is the first name only indicates a cell with a largest index among the multiple cells.

In one subembodiment, the only one field in the first DCI of which the name is the first name only indicates a cell with a second largest index among the multiple cells.

In one subembodiment, the only one field in the first DCI of which the name is the first name only indicates a cell of which a corresponding component carrier (CC) has a lowest frequency among the multiple cells.

In one subembodiment, the only one field in the first DCI of which the name is the first name only indicates a cell of which a corresponding component carrier (CC) has a highest frequency among the multiple cells.

In one embodiment, when the type of the first combination in the first combination list is the second type, the first combination is related to the multiple cells, where the number of the multiple cells is 2.

In one embodiment, when the type of the first combination in the first combination list is the second type, the first combination is related to the multiple cells, where the number of the multiple cells is 3.

In one embodiment, when the type of the first combination in the first combination list is the second type, the first combination is related to the multiple cells, where the number of the multiple cells is 4.

In one embodiment, the multiple cells make up a cell set, and candidates of the multiple cells include Q1 cell sets, the first field of the first DCI being used for indicating the multiple cells in the Q1 cell sets, where Q1 is a positive integer greater than 1.

In one subembodiment, among the Q1 cell sets there are two cell sets comprising a same cell.

In one subembodiment, among the Q1 cell sets there are two cell sets by which any two cells comprised are different.

In one subembodiment, a value of Q1 is used to determine a maximum number of information bits occupied by the first field of the first DCI.

In one subembodiment, the maximum number of information bits occupied by the first field of the first DCI is equal to $\lceil \log_2(Q1) \rceil$.

In one subembodiment, the maximum number of information bits occupied by the first field of the first DCI is equal to $\lfloor \log_2(Q1) \rfloor + 1$.

In one embodiment, the first field of the first DCI is a Carrier Indicator Field (CIF).

Embodiment 2

Figure 2:
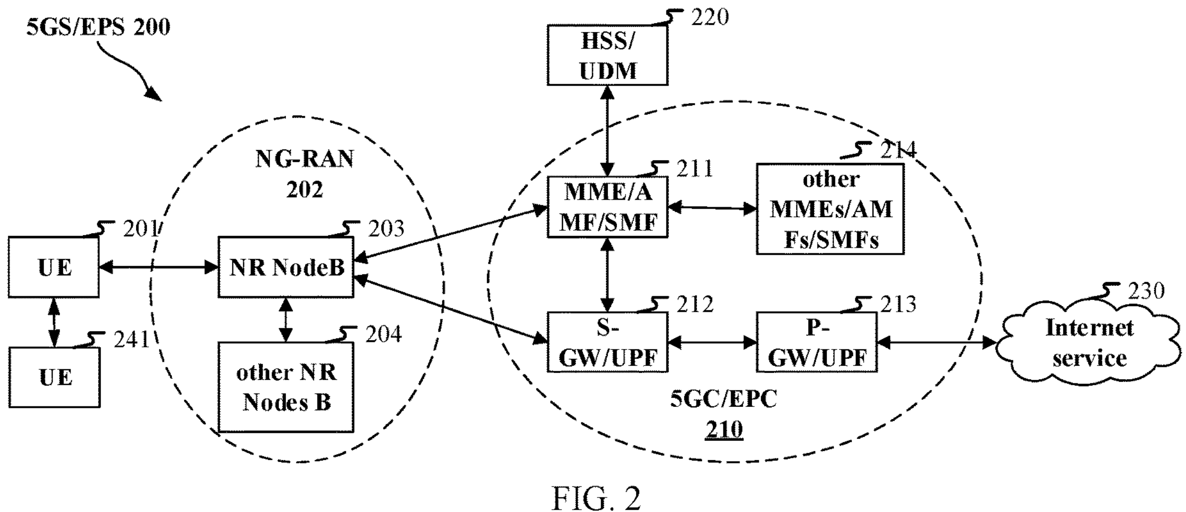
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The 5G NR or LTE network 200 can be called a 5G System/Evolved Packet System (5GS/EPS) 200 or other appropriate terms. The 5GS/EPS 200 may comprise one or more UEs 201, a UE 241 in sidelink communication with the UE(s) 201, an NG-RAN 202, a 5G CoreNetwork/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the first node in the present application includes the UE 241.

In one embodiment, the second node in the present application includes the gNB 203.

Embodiment 3

Figure 3:
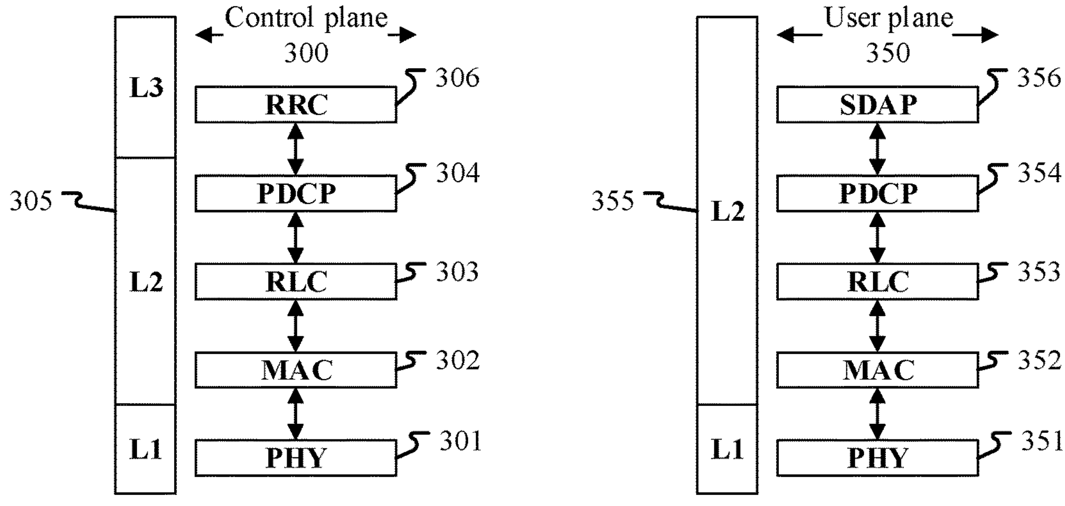
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling is generated by the RRC 306, or the RRC 356.

In one embodiment, the first DCI is generated by the PHY 301, or the PHY 351.

In one embodiment, the first-type channel is generated by the PHY 301, or the PHY 351.

Embodiment 4

Figure 4:
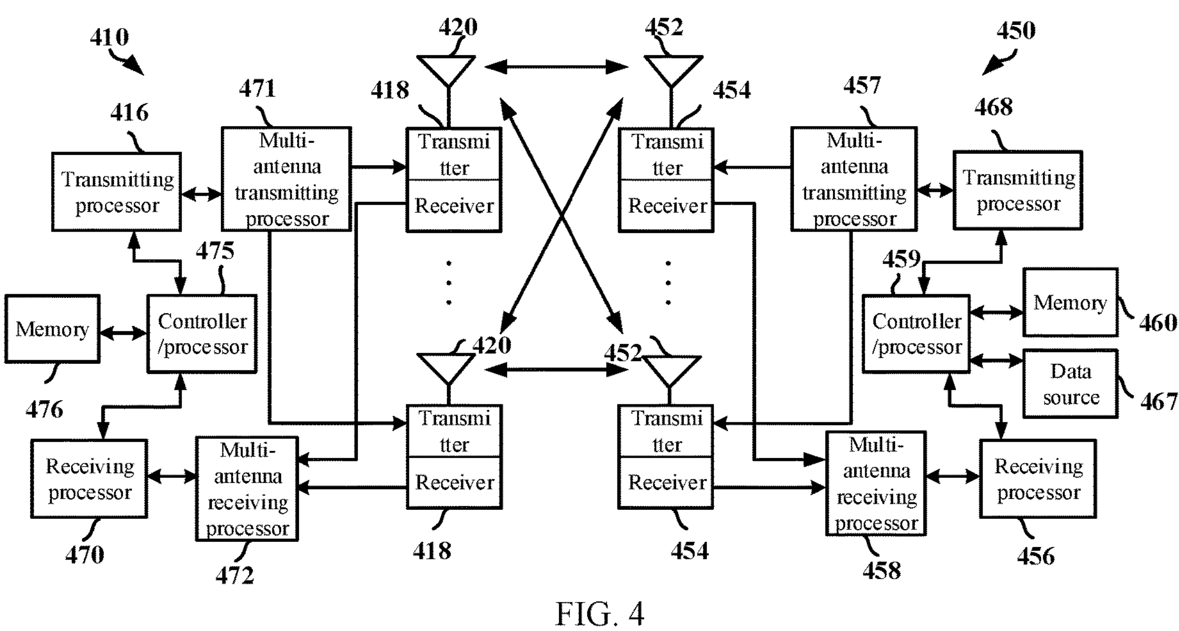
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any parallel stream targeting the second communication device 450. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 firstly converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: receives a first signaling and a first DCI; as a response to receiving the first DCI, operates a first-type channel on each cell among the multiple cells; the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and the operating is receiving and the first-type channel is a PDSCH, or, the operating is transmitting and the first-type channel is a PUSCH; M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

In one embodiment, the second communication device 450 comprises a memory that stores a computer readable instruction program, the computer readable instruction program generates actions when executed by at least one processor, which include: receiving a first signaling and a first DCI; as a response to receiving the first DCI, operating a first-type channel on each cell among the multiple cells.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits a first signaling and a first DCI; as a response to transmitting the first DCI, executes a first-type channel on each cell among the multiple cells; the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and the executing is transmitting and the first-type channel is a PDSCH, or, the executing is receiving and the first-type channel is a PUSCH; M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

In one embodiment, the first communication device 410 comprises a memory that stores a computer readable instruction program, the computer readable instruction program generates actions when executed by at least one processor, which include: transmitting a first signaling and a first DCI; as a response to transmitting the first DCI, executing a first-type channel on each cell among the multiple cells.

In one embodiment, the first node in the present application comprises the second communication device 450.

In one embodiment, the second node in the present application comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling in the present application; at least one of the antenna 420, the transmitter 418, the transmitting processor 416, the multi-antenna transmitting processor 471, the controller/processor 475 or the memory 476 is used to transmit the first signaling in the present application.

In one embodiment, at least one of the antenna 452, the receiver 454, the receiving processor 456, the multi-antenna receiving processor 458, the controller/processor 459, the memory 460 or the data source 467 is used to receive the first DCI in the present application; at least one of the antenna 420, the transmitter 418, the transmitting processor 416, the multi-antenna transmitting processor 471, the controller/processor 475 or the memory 476 is used to transmit the first DCI in the present application.

In one embodiment, at least one of the antenna 452, the transmitter 454, the transmitting processor 468, the multi-antenna transmitting processor 457, the controller/processor 459, the memory 460 or the data source 467 is used to transmit the first-type channel in the present application; at least one of the antenna 420, the receiver 418, the receiving processor 470, the multi-antenna receiving processor 472, the controller/processor 475 or the memory 476 is used to receive the first-type channel in the present application.

In one embodiment, at least one of the antenna 452, the receiver 454, the receiving processor 456, the multi-antenna receiving processor 458, the controller/processor 459, the memory 460 or the data source 467 is used to receive the first-type channel in the present application; at least one of the antenna 420, the transmitter 418, the transmitting processor 416, the multi-antenna transmitting processor 471, the controller/processor 475 or the memory 476 is used to transmit the first-type channel in the present application.

Embodiment 5

Figure 5:
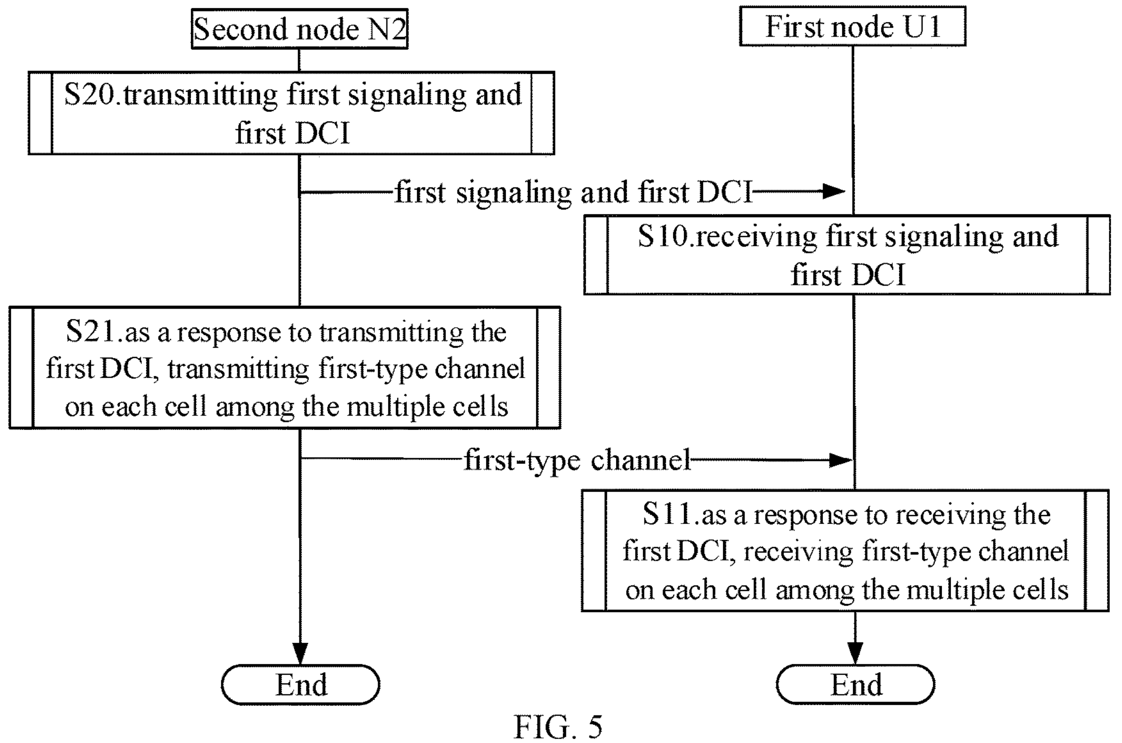
FIG. 5 illustrates a flowchart of transmission according to one embodiment of the present application.

Embodiment 5 illustrates a flowchart of transmission according to one embodiment of the present application, as shown in FIG. 5. In FIG. 5, a first node U1 and a second node N2 are respectively two communication nodes that transmit via an air interface.

The first node U1 receives a first signaling and first DCI in step S10; and in step S11, as a response to receiving the first DCI, receives a first-type channel on each cell among the multiple cells.

The second node N2 transmits a first signaling and first DCI in step S20; and in step S21, as a response to transmitting the first DCI, transmits a first-type channel on each cell among the multiple cells.

In Embodiment 5, the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

In one embodiment, the first node U1 is the first node in the present application.

In one embodiment, the second node N2 is the second node in the present application.

In one embodiment, an air interface between the second node N2 and the first node U1 includes a radio interface between a base station and a UE.

In one embodiment, an air interface between the second node N2 and the first node U1 includes a radio interface between a relay node and a UE.

In one embodiment, an air interface between the second node N2 and the first node U1 includes a radio interface between a UE and another UE.

In one embodiment, the second node N2 is a maintenance base station for a serving cell of the first node U1.

In one embodiment, the first DCI is used by the first node U1 for scheduling the first-type channel(s).

In one embodiment, the first node receives the first-type channel on each cell among the multiple cells.

In one embodiment, the second node transmits the first-type channel on each cell among the multiple cells.

In one embodiment, the first-type channel is a PD SCH.

In one embodiment, a first-type channel received on each cell among the multiple cells occupies a different frequency-domain resource.

In one embodiment, a first-type channel received on each cell among the multiple cells occupies a different component carrier.

In one embodiment, a first-type channel received on each cell among the multiple cells occupies a different BWP.

In one embodiment, a first-type channel received on each cell among the multiple cells occupies a different RB.

In one embodiment, a transport channel corresponding to the first-type channel includes a DL-SCH.

Embodiment 6

Embodiment 6 illustrates a flowchart of transmission according to another embodiment of the present application, as shown in FIG. 6. In FIG. 6, a first node U3 and a second node N4 are respectively two communication nodes that transmit via an air interface.

The first node U3 receives a first signaling and first DCI in step S30; and in step S31, as a response to receiving the first DCI, transmits a first-type channel on each cell among the multiple cells.

The second node N4 transmits a first signaling and first DCI in step S40; and in step S41, as a response to transmitting the first DCI, receives a first-type channel on each cell among the multiple cells.

In Embodiment 6, the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

In one embodiment, the first node U3 is the first node in the present application.

In one embodiment, the second node N4 is the second node in the present application.

In one embodiment, an air interface between the second node N4 and the first node U3 includes a radio interface between a base station and a UE.

In one embodiment, an air interface between the second node N4 and the first node U3 includes a radio interface between a relay node and a UE.

In one embodiment, an air interface between the second node N4 and the first node U3 includes a radio interface between a UE and another UE.

In one embodiment, the second node N4 is a maintenance base station for a serving cell of the first node U3.

In one embodiment, the first DCI is used by the first node U3 for scheduling the first-type channel(s).

In one embodiment, the first node transmits the first-type channel on each cell among the multiple cells.

In one embodiment, the second node receives the first-type channel on each cell among the multiple cells.

In one embodiment, the first-type channel is a PUSCH.

In one embodiment, a first-type channel received on each cell among the multiple cells occupies a different frequency-domain resource.

In one embodiment, a first-type channel received on each cell among the multiple cells occupies a different component carrier.

In one embodiment, a first-type channel received on each cell among the multiple cells occupies a different BWP.

In one embodiment, a first-type channel received on each cell among the multiple cells occupies a different RB.

In one embodiment, a transport channel corresponding to the first-type channel includes a UL-SCH.

Embodiment 7

Embodiment 7 illustrates a schematic diagram of a first combination's position corresponding to the value of a first field of a first DCI according to one embodiment of the present application; as shown in FIG. 7.

In Embodiment 7, the first combination is a combination of which a position in the first combination list corresponds to a value of the first field of the first DCI.

In one embodiment, a number of combinations comprised by the first combination list is equal to a number of candidates of the value of the first field.

In one embodiment, combinations in the first combination list sequentially correspond to the values 0, 1, 2 . . . of the first field.

In one embodiment, combinations in the first combination list sequentially correspond to the values 1, 2, 3 . . . of the first field.

In one embodiment, each combination among the combinations in the first combination list only comprises the first name.

In one embodiment, each combination among the combinations in the first combination list comprises a name other than the first name.

In one embodiment, each combination among the combinations in the first combination list comprises at least one name other than the first name.

In one embodiment, each combination among the combinations in the first combination list comprises multiple names other than the first name.

Embodiment 8

Embodiment 8 illustrates a schematic diagram of value(s) of first-type index(es) comprised by a first combination indicating multiple cells according to one embodiment of the present application; as shown in FIG. 8.

In Embodiment 8, each combination in the first combination list comprises at least one first-type index, and there exists no first-type index that belongs to both two combinations in the first combination list, the first combination is a combination that meets a first condition in the first combination list, the first condition being that the value/values of the first-type index/indexes being comprised indicates/indicate the multiple cells.

In one embodiment, when a value of a first-type index is equal to the value of the first field of the first DCI, the first-type index indicates the multiple cells.

In one subembodiment, a range of values of the first-type index is equivalent to a range of values of the first field of the first DCI.

In one embodiment, the value of the first-type index is equal to the value of the first field plus 1.

In one embodiment, the value of the first-type index is equal to the value of the first field minus 1.

In one embodiment, when a value of a first-type index is mapped to the value of the first field of the first DCI, the first-type index indicates the multiple cells; the mapping is configured by a higher layer signaling.

In one subembodiment, a range of values of the first-type index is larger than a range of values of the first field of the first DCI.

In one subembodiment, two different first-type indexes are mapped to a same value of the first field of the first DCI.

In one subembodiment, multiple different first-type indexes are mapped to a same value of the first field of the first DCI.

In one embodiment, at least one combination in the first combination list comprises multiple first-type indexes.

In one embodiment, each combination in the first combination list comprised only one first-type index.

In one embodiment, the value of the first field of the first DCI corresponds to a combination of cell indexes of the multiple cells.

In one embodiment, each cell among the multiple cells is identified by a cell index.

In one embodiment, the cell indexes of the multiple cells are configured by a higher layer signaling.

In one embodiment, the cell indexes of the multiple cells are configured by an RRC signaling.

In one embodiment, the cell indexes of the multiple cells are configured by an IE SCellConfig.

In one embodiment, the cell indexes of the multiple cells are configured by an IE ServCellIndex.

In one embodiment, each of the cell indexes of the multiple cells is a ServCellIndex.

In one embodiment, each of the cell indexes of the multiple cells is a SCellIndex.

In one embodiment, each of the cell indexes of the multiple cells is a servCellId.

In one embodiment, each of the cell indexes of the multiple cells is a ServCellIdentity.

In one embodiment, more than one cell among the multiple cells is respectively assigned with a SCellIndex or a ServCellIndex.

In one embodiment, each of the cell indexes of the multiple cells includes at least one of a ServCellIndex or a SCellIndex; the cell index indicated by a SpCellConfig is a ServCellIndex; the cell index indicated by a SCellConfig is a SCellIndex.

Embodiment 9

Embodiment 9 illustrates a schematic diagram of each combination in a first combination list comprising multiple names according to one embodiment of the present application; as shown in FIG. 9.

In Embodiment 9, each combination in the first combination list comprises multiple names, and each of the multiple names is a name of a DCI field, where any two names among the multiple names are different.

In one embodiment, the multiple names include one of Bandwidth Part (BWP) Indicator, Modulation and Coding Scheme (MCS), Frequency Domain Resource Assignment (FDRA), VRB-to-PRB mapping, PRB bundling size indicator, Frequency hopping flag, Rate matching indicator, Antenna port, Transmission configuration indication (TCI), PTRS-DMRS association, SRS resource indicator, Precoding information and number of layers, SRS request, SRS resource indicator, SRS offset indicator, DMRS sequence initialization, TPC command for scheduled PUSCH, Channel Access-Cpext, Open-loop power control parameter set indication, HARQ process number, or ZP CSI-RS trigger.

In one embodiment, the multiple names include MCS and FDRA.

In one embodiment, the multiple names include BWP and FDRA.

In one embodiment, the multiple names include VRB-to-PRB mapping and FDRA.

In one embodiment, the multiple names include FDRA and PRB bundling size indicator.

In one embodiment, the multiple names include FDRA and Frequency hopping flag.

In one embodiment, the multiple names include FDRA and Rate matching indicator.

In one embodiment, the multiple names include MCS and Rate matching indicator.

In one embodiment, the multiple names include Antenna port and TCI.

In one embodiment, the multiple names include Antenna port and PTRS-DMRS association.

In one embodiment, the multiple names include SRS resource indicator and Precoding information and number of layers.

In one embodiment, the multiple names include PTRS-DMRS association and Precoding information and number of layers.

In one embodiment, the multiple names include Antenna port and Precoding information and number of layers.

In one embodiment, the multiple names include SRS request and SRS resource indicator.

In one embodiment, the multiple names include MCS and Precoding information and number of layers.

Embodiment 10

Embodiment 10 illustrates a schematic diagram of M fields being respectively used for scheduling of M cells according to one embodiment of the present application; as shown in FIG. 10.

In FIG. 10, the M fields are respectively represented by field #1 . . . and field #M; the M cells are respectively represented by cell #1 . . . , and cell #M.

In Embodiment 10, when the type of the first combination is the second type, the multiple cells consist of M cells, and the M fields are respectively used for schedulings of the M cells.

In one embodiment, the value of M is 2, 3 or 4.

In one embodiment, the M fields correspond to the M cells sequentially.

In one subembodiment, the M fields respectively schedule the M cells in sequential order and the M cells are sorted according to an ascending order of cell index.

In one subembodiment, the M fields respectively schedule the M cells in sequential order and the M cells are sorted according to a descending order of cell index.

In one subembodiment, the M fields respectively schedule the M cells in sequential order and the M cells are sorted according to an ascending order of frequency of component carriers of the multiple cells.

In one subembodiment, the M fields respectively schedule the M cells in sequential order and the M cells are sorted according to a descending order of frequency of component carriers of the multiple cells.

In one embodiment, the M fields are of an identical bitwidth.

In one embodiment, there are two fields having different bitwidths among the M fields.

In one embodiment, there are multiple fields having different bitwidths among the M fields.

Embodiment 11

Embodiment 11 illustrates a schematic diagram of the first M1 field(s) among M fields being (respectively) used for scheduling of M1 cell(s) according to one embodiment of the present application; as shown in FIG. 11.

In FIG. 11, the M fields are respectively represented by field #1 . . . and field #M; the M1 cell(s) is (are respectively) represented by cell #1 . . . , and cell #M1.

In Embodiment 11, when the type of the first combination is the second type, the multiple cells consist of M1 cells, where the first M1 fields of the M fields are respectively used for schedulings of the M1 cells, M being a positive integer no less than M1.

In one embodiment, M is fixed to 4.

In one embodiment, M is configured by RRC signaling.

In one subembodiment, an RRC signaling for configuring M is applicable to all combinations in the first combination list.

In one embodiment, the M1 fields correspond to the M1 cells sequentially.

In one subembodiment, the M1 fields respectively schedule the M1 cells in sequential order and the M1 cells are sorted according to an ascending order of cell index.

In one subembodiment, the M1 fields respectively schedule the M1 cells in sequential order and the M1 cells are sorted according to a descending order of cell index.

In one subembodiment, the M1 fields respectively schedule the M1 cells in sequential order and the M1 cells are sorted according to an ascending order of frequency of component carriers of the multiple cells.

In one subembodiment, the M1 fields respectively schedule the M1 cells in sequential order and the M1 cells are sorted according to a descending order of frequency of component carriers of the multiple cells.

In one embodiment, the M1 fields are of an identical bitwidth.

In one embodiment, there are two fields having different bitwidths among the M1 fields.

In one embodiment, there are multiple fields having different bitwidths among the M1 fields.

Embodiment 12

Figure 12:
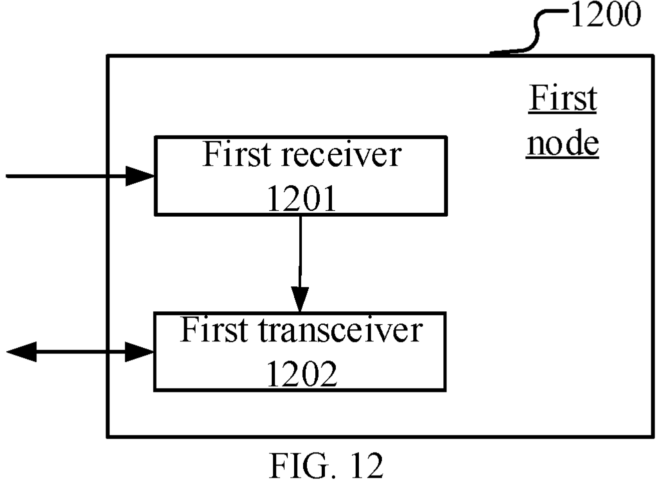
FIG. 12 illustrates a structure block diagram of a processing device in a first node according to one embodiment of the present application.

Embodiment 12 illustrates a structure block diagram of a processing device used in a first node according to one embodiment of the present application; as shown in FIG. 12. In FIG. 12, a processing device 1200 in a first node is comprised of a first receiver 1201 and a first transceiver 1202.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transceiver 1202 comprises at least one of the antenna 452, the transmitter 454, the transmitting processor 468, the multi-antenna transmitting processor 457, the controller/processor 459, the memory 460 or the data source 467 in Embodiment 4.

The first receiver 1201 receives a first signaling and a first DCI;

the first transceiver 1202, as a response to receiving the first DCI, operates a first-type channel on each cell among the multiple cells.

In Embodiment 12, the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and the operating is receiving and the first-type channel is a PDSCH, or, the operating is transmitting and the first-type channel is a PUSCH; M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

In one embodiment, the first combination is a combination of which a position in the first combination list corresponds to a value of the first field of the first DCI.

In one embodiment, each combination in the first combination list comprises at least one first-type index, and there exists no first-type index that belongs to both two combinations in the first combination list, the first combination is a combination that meets a first condition in the first combination list, the first condition being that the value/values of the first-type index/indexes being comprised indicates/indicate the multiple cells.

In one embodiment, each combination in the first combination list comprises multiple names, and each of the multiple names is a name of a DCI field, where any two names among the multiple names are different.

In one embodiment, when the type of the first combination is the second type, the multiple cells consist of M cells, and the M fields are respectively used for scheduling of the M cells.

In one embodiment, when the type of the first combination is the second type, the multiple cells consist of M1 cells, where the first M1 fields of the M fields are respectively used for scheduling of the M1 cells, M being a positive integer no less than M1.

Embodiment 13

Figure 13:
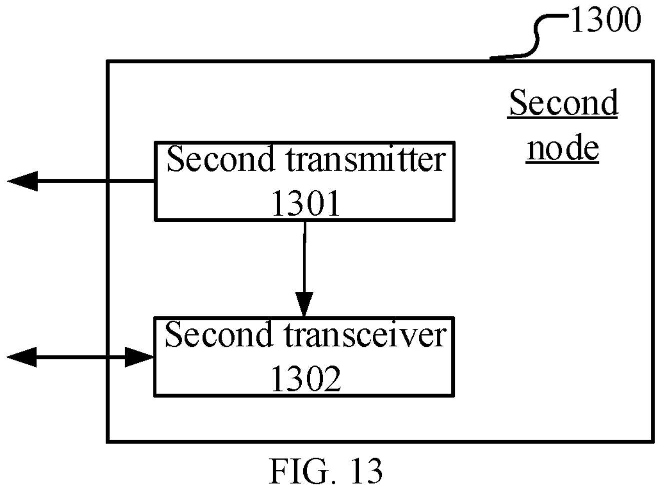
FIG. 13 illustrates a structure block diagram of a processing device used in a second node according to one embodiment of the present application.

Embodiment 13 illustrates a structure block diagram of a processing device used in a second node according to one embodiment of the present application; as shown in FIG. 13. In FIG. 13, a processing device 1300 in a second node is comprised of a second transmitter 1301 and a second transceiver 1302.

In one embodiment, the second node is a base station.

In one embodiment, the second node is a UE.

In one embodiment, the second node is a relay node.

In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second transceiver 1302 comprises at least one of the antenna 420, the receiver 418, the receiving processor 470, the multi-antenna receiving processor 472, the controller/processor 475 or the memory 476 in Embodiment 4.

The second transmitter 1301 transmits a first signaling and a first DCI;

the second transceiver 1302, as a response to transmitting the first DCI, executes a first-type channel on each cell among the multiple cells.

In Embodiment 13, the first signaling indicates a type of each combination in a first combination list, and candidates of the type of each combination in the first combination list include at least a first type and a second type; each combination in the first combination list comprises a first name, the first name being a name of a DCI field; the first DCI comprises a first field, and the first field of the first DCI indicates multiple cells; the first DCI comprises and only comprises M field(s), where M is a positive integer, and a name of each of the M field(s) is the first name; and the executing is transmitting and the first-type channel is a PDSCH, or, the executing is receiving and the first-type channel is a PUSCH; M is configurable, and M is dependent on the type of a first combination; when the type of the first combination is the first type, M is 1; when the type of the first combination is the second type, M is greater than 1; the first combination is one that belongs to the first combination list, and the first combination is related to the multiple cells, where the first name is different from a name of the first field.

In one embodiment, the first combination is a combination of which a position in the first combination list corresponds to a value of the first field of the first DCI.

In one embodiment, each combination in the first combination list comprises at least one first-type index, and there exists no first-type index that belongs to both two combinations in the first combination list, the first combination is a combination that meets a first condition in the first combination list, the first condition being that the value/values of the first-type index/indexes being comprised indicates/indicate the multiple cells.

In one embodiment, each combination in the first combination list comprises multiple names, and each of the multiple names is a name of a DCI field, where any two names among the multiple names are different.

In one embodiment, when the type of the first combination is the second type, the multiple cells consist of M cells, and the M fields are respectively used for schedulings of the M cells.

In one embodiment, when the type of the first combination is the second type, the multiple cells consist of M1 cells, where the first M1 fields of the M fields are respectively used for schedulings of the M1 cells, M being a positive integer no less than M1.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any change or modification made based on the embodiments described in this specification, if, through which similar partial or all technical effects can be obtained, shall be considered apparent and fall within the scope of protection of the present invention.

What is claimed is:

1. A user equipment (UE) configured for wireless communications, the UE comprising:

a transceiver configured to receive a first signaling and a first downlink control information (DCI), wherein the first signaling indicates a type of each combination in a first combination list, and candidates of the type of each combination in the first combination list include at least a first type and a second type, wherein each combination in the first combination list only comprises a first name, the first name being a name of a DCI field, wherein the first DCI comprises a first field, and the first field of the first DCI indicates multiple cells, wherein the first DCI comprises and only comprises a number of fields (M) of which a name of each field is the first name, and the transceiver is configured to, in response to receiving the first DCI, operate a first-type channel on each cell among the multiple cells, wherein the transceiver is configured to receive and the first-type channel is a physical downlink shared channel (PDSCH), or the transceiver is configured to transmit and the first-type channel is a physical uplink shared channel (PUSCH), wherein M is configurable, and M is dependent on the type of a first combination, wherein when the type of the first combination is the first type, M is 1, wherein when the type of the first combination is the second type, M is greater than 1, wherein the first combination is one that belongs to the first combination list, and the first combination is related to the multiple cells, and wherein the first name is different from a name of the first field.

2. The UE of claim 1, wherein the first combination is a combination of which a position in the first combination list corresponds to a value of the first field of the first DCI.

3. The UE of claim 1, wherein the first signaling comprises a number (Q) of sub-parameters, where Q is equal to a number of combinations comprised in the first combination list; the first combination list comprises Q combinations, and the Q sub-parameters comprised by the first signaling are respectively used for indicating types of the Q combinations in the first combination list; the Q sub-parameters respectively comprise Q indexes; the Q indexes comprised by the Q sub-parameters are respectively related to Q cell sets, or, the Q indexes include an index equal to a value of the first field of the first DCI.

4. The UE of claim 3, wherein the multiple cells make up a cell set, and candidates of the multiple cells include the Q cell sets, wherein the Q indexes are respectively associated to the Q cell sets.

5. The UE of claim 1, wherein when the type of the first combination is the second type, the multiple cells comprise M cells, wherein the M fields are respectively used for scheduling of the M cells.

6. The UE of claim 1, wherein the type of each combination in the first combination list is the first type, wherein field(s) in the first DCI of which the name is the first name only include one field, and the only one field of which the name is the first name in the first DCI indicates same information for all cells among the multiple cells.

7. The UE of claim 1, wherein the first name includes SRS resource indicator, or includes antenna port.

8. A base station configured for wireless communications, the base station comprising:

a transceiver configured to transmit a first signaling and a first downlink control information (DCI), wherein the first signaling indicates a type of each combination in a first combination list, and candidates of the type of each combination in the first combination list include at least a first type and a second type, wherein each combination in the first combination list only comprises a first name, the first name being a name of a DCI field, wherein the first DCI comprises a first field, and the first field of the first DCI indicates multiple cells, wherein the first DCI comprises and only comprises a number of fields (M) of which a name of each field is the first name; and the transceiver is configured to, in response to transmitting the first DCI, execute a first-type channel on each cell among the multiple cells, wherein the transceiver is configured to transmit and the first-type channel is a physical downlink shared channel (PDSCH), or the transceiver is configured to receive and the first-type channel is a a physical uplink shared channel (PUSCH), wherein M is configurable, and M is dependent on the type of a first combination, wherein when the type of the first combination is the first type, M is 1, wherein when the type of the first combination is the second type, M is greater than 1, wherein the first combination is one that belongs to the first combination list, and the first combination is related to the multiple cells, and wherein the first name is different from a name of the first field.

9. The base station of claim 8, wherein the first combination is a combination of which a position in the first combination list corresponds to a value of the first field of the first DCI.

10. The base station of claim 8, wherein the first signaling comprises a number (Q) of sub-parameters, where Q is equal to a number of combinations comprised in the first combination list; the first combination list comprises Q combinations, and the Q sub-parameters comprised by the first signaling are respectively used for indicating types of the Q combinations in the first combination list; the Q sub-parameters respectively comprise Q indexes; the Q indexes comprised by the Q sub-parameters are respectively related to Q cell sets, or, the Q indexes include an index equal to a value of the first field of the first DCI.

11. The base station of claim 10, wherein the multiple cells make up a cell set, and candidates of the multiple cells include the Q cell sets, wherein the Q indexes are respectively associated to the Q cell sets.

12. The base station of claim 8, wherein the type of each combination in the first combination list is the first type, wherein field(s) in the first DCI of which the name is the first name only includes one field, and the only one field of which the name is the first name in the first DCI indicates same information for all cells among the multiple cells.

13. The base station according to claim 8, wherein the first name includes SRS resource indicator, or includes antenna port.

14. A method for use in a user equipment (UE) configured for wireless communications, the method comprising:

receiving a first signaling and a first downlink control information (DCI), wherein the first signaling indicates a type of each combination in a first combination list, and candidates of the type of each combination in the first combination list include at least a first type and a second type, wherein each combination in the first combination list only comprises a first name, the first name being a name of a DCI field, wherein the first DCI comprises a first field, and the first field of the first DCI indicates multiple cells, wherein the first DCI comprises and only comprises a number of fields (M) of which a name of each field is the first name; and operating, in response to receiving the first DCI, a first-type channel on each cell among the multiple cells, wherein the operating is receiving and the first-type channel is a physical downlink shared channel (PDSCH), or the operating is transmitting and the first-type channel is a physical uplink shared channel (PUSCH), wherein M is configurable, and M is dependent on the type of a first combination, wherein when the type of the first combination is the first type, M is 1, wherein when the type of the first combination is the second type, M is greater than 1, wherein the first combination is one that belongs to the first combination list, and the first combination is related to the multiple cells, and wherein the first name is different from a name of the first field.

15. The method of claim 14, wherein the first combination is a combination of which a position in the first combination list corresponds to a value of the first field of the first DCI.

16. The method of claim 14, wherein the first signaling comprises a number (Q) of sub-parameters, where Q is equal to a number of combinations comprised in the first combination list; the first combination list comprises Q combinations, and the Q sub-parameters comprised by the first signaling are respectively used for indicating types of the Q combinations in the first combination list; the Q sub-parameters respectively comprise Q indexes; the Q indexes comprised by the Q sub-parameters are respectively related to Q cell sets, or, the Q indexes include an index equal to a value of the first field of the first DCI.

17. The method of claim 16, wherein the multiple cells make up a cell set, and candidates of the multiple cells include the Q cell sets, wherein Q indexes are respectively associated to the Q cell.

18. The method of claim 14, wherein when the type of the first combination is the second type, the multiple cells comprise M cells, and the M fields are respectively used for scheduling of the M cells.

19. The method of claim 14, wherein the type of each combination in the first combination list is the first type, wherein field(s) in the first DCI of which the name is the first name only include one field, and the only one field of which the name is the first name in the first DCI indicates same information for all cells among the multiple cells.

20. The method of claim 14, wherein the first name includes SRS resource indicator, or includes antenna port.

* * * * *